US010515653B1

(12) United States Patent
Pogue et al.

(10) Patent No.: US 10,515,653 B1
(45) Date of Patent: Dec. 24, 2019

(54) VOICE CONTROLLED SYSTEM

(71) Applicant: Amazon Technologies, Inc., Seattle, WA (US)

(72) Inventors: Michael Alan Pogue, Sunnyvale, CA (US); Kavitha Velusamy, San Jose, CA (US); Preethi Parasseri Narayanan, Cupertino, CA (US); Tony David, San Jose, CA (US); Philip Ryan Hilmes, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/114,993

(22) Filed: Aug. 28, 2018

Related U.S. Application Data

(62) Division of application No. 14/134,546, filed on Dec. 19, 2013, now Pat. No. 10,147,441.

(51) Int. Cl.
*G10L 25/00* (2013.01)
(52) U.S. Cl.
CPC .................................. *G10L 25/00* (2013.01)
(58) Field of Classification Search
CPC ......... G10L 25/00; G10L 25/51; G10L 15/10; G10L 15/20; G10L 15/22; G10L 15/08; G10L 15/26; G10L 15/32; G10L 15/34; G10L 21/02; G06F 3/167; H04R 27/00; H04R 3/005; H04R 2227/003; H04R 2227/005; H04R 2227/007
See application file for complete search history.

(56) References Cited

U.S. PATENT DOCUMENTS

| 5,987,519 | A | * | 11/1999 | Peifer | ............... | G06F 19/3418 |
|---|---|---|---|---|---|---|
| | | | | | | 709/230 |
| 6,334,688 | B1 | | 1/2002 | Niwa | | |
| 7,060,006 | B1 | | 6/2006 | Watterson et al. | | |
| 7,418,392 | B1 | | 8/2008 | Mozer et al. | | |
| 7,720,683 | B1 | | 5/2010 | Vermeulen et al. | | |
| 7,774,204 | B2 | | 8/2010 | Mozer et al. | | |
| 2005/0084322 | A1 | | 4/2005 | Apar et al. | | |
| 2006/0128307 | A1 | * | 6/2006 | Levien | ................ | H04W 4/16 |
| | | | | | | 455/41.2 |

(Continued)

FOREIGN PATENT DOCUMENTS

WO    WO2011088053 A2    7/2011

OTHER PUBLICATIONS

"Amazon Echo", retrieved at <<https://en.wikipedia.org/wiki/Amazon_Echo>>, Wikipedia, pp. 1-5.

(Continued)

*Primary Examiner* — Yogeshkumar Patel
(74) *Attorney, Agent, or Firm* — Lee & Hayes, P.C.

(57) ABSTRACT

A distributed voice controlled system has a primary assistant and at least one secondary assistant. The primary assistant has a housing to hold one or more microphones, one or more speakers, and various computing components. The secondary assistant is similar in structure, but is void of speakers. The voice controlled assistants perform transactions and other functions primarily based on verbal interactions with a user. The assistants within the system are coordinated and synchronized to perform acoustic echo cancellation, selection of a best audio input from among the assistants, and distributed processing.

20 Claims, 10 Drawing Sheets

(56) References Cited

U.S. PATENT DOCUMENTS

| | | | |
|---|---|---|---|
| 2012/0203379 A1 | 8/2012 | Sloo et al. | |
| 2012/0223885 A1 | 9/2012 | Perez | |
| 2013/0285922 A1 | 10/2013 | Alberth et al. | |
| 2014/0172953 A1* | 6/2014 | Blanksteen | H04W 4/043 709/203 |
| 2015/0147982 A1 | 5/2015 | Aihsan et al. | |
| 2018/0321905 A1* | 11/2018 | Fountaine | G06F 3/167 |

OTHER PUBLICATIONS

Amazon Echo, Google Search before Dec. 2013, retrieved at <<https://www.google.com/search?q=Amazon+Echo&source=Int&tbs=cdr%3A1%2Ccd_min%3A%2Ccd_max%3A2013&tbm=>>, 2 pages.

Office Action for U.S. Appl. No. 14/134,546, dated Feb. 16, 2018, Pogue, "Voice Controlled System", 24 pages.

Office Action for U.S. Appl. No. 14/134,546, dated Mar. 9, 2017, Michael Alan Pogue, "Voice Controlled System", 25 pages.

Office Action for U.S. Appl. No. 14/134,546, dated Jun. 28, 2017, Michael Alan Pogue, "Voice Controlled System", 25 pages.

Office Action for U.S. Appl. No. 14/134,546, dated Aug. 10, 2016, Michael Alan Pogue, "Voice Controlled System", 12 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

\* cited by examiner

VOICE CONTROLLED SYSTEM

CROSS-REFERENCE TO RELATED APPLICATIONS

This application is a divisional of and claims priority to U.S. patent application Ser. No. 14/134,546, filed on Dec. 19, 2013, and entitled "Voice Controlled System," which is incorporated by reference herein in its entirety.

BACKGROUND

Homes are becoming more connected with the proliferation of computing devices such as desktops, tablets, entertainment systems, and portable communication devices. As these computing devices evolve, many different ways have been introduced that allow users to interact with computing devices, such as through mechanical devices (e.g., keyboards, mice, etc.), touch screens, motion, and gesture. Another way to interact with computing devices is through speech.

To implement speech interaction, a device is commonly equipped with a microphone to receive voice input from a user and a speech recognition component to recognize and understand the voice input. The device also commonly includes a speaker to emit audible responses to the user. With speech interaction, the device may be operated essentially "hands free".

Voice interaction with computing devices can pose unique challenges in detecting, receiving and interpreting oral instructions. One challenge is that oral speech is directional and attenuates over distance. Detecting and receiving an audio speech signal is therefore complicated when the speaker is farther from the microphone, turned away from the microphone, and/or moving about the environment. Another challenge concerns ambient or background noise that may degrade signal quality of the desired speech input.

Accordingly, there is a continuing need for improved designs of voice enabled devices that improve speech interactions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
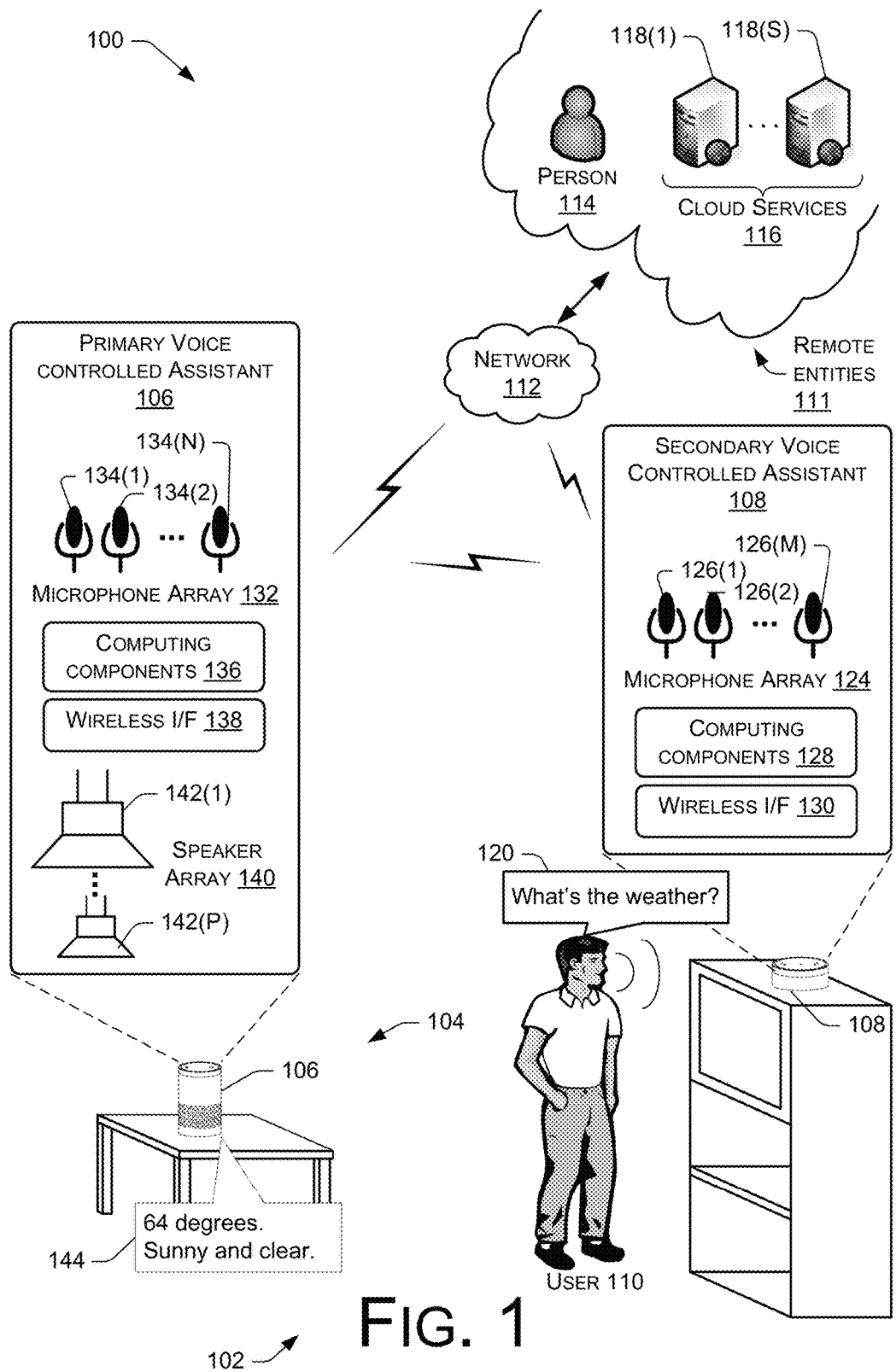
FIG. 1 shows an illustrative voice interactive computing architecture set in an example environment that includes a local user (i.e., near end talker) communicating with a remote person (i.e., far end talker) or cloud service through use of a distributed voice controlled system having multiple assistants spaced throughout the environment.

A distributed voice controlled system has a primary assistant and one or more secondary assistants. Each assistant is equipped with one or more microphones to receive voice input, computing capabilities, and a wireless LAN (WLAN) interface. In this way, the voice controlled system may be implemented as a set of hands-free devices that rely primarily, if not exclusively, on voice interactions with a user. The distributed voice controlled system is further discussed in the context of an architecture in which the system is connected to communicate with remote people (i.e., far end talkers) or a network accessible computing platform, or "cloud service", via a network.

To illustrate one example usage scenario, the voice controlled system may be positioned in a room (e.g., at home, work, store, etc.) or spread over multiple rooms or areas to receive user input in the form of voice interactions, such as spoken requests or a conversational dialogue. Depending on the request, the voice controlled system may perform any number of actions or functions. For instance, the system may play music or emit verbal answers to the user. The system may alternatively function as a communication device to facilitate network voice communications with a far end talker. As still another alternative, the user may ask a question or submit a search request to be performed by a remote cloud service. For instance, the user's voice input may be transmitted from one of the assistants over a network to the cloud service, where the voice input is interpreted and used to perform a function. In the event that the function creates a response, the cloud service transmits the response back over the network to the system, where it may be audibly emitted to the user by the primary assistant.

In another example usage scenario, the voice controlled system may be used to engage in transactions, such as financial or sale transactions. Suppose, for example, the user employs the voice controlled system to engage in an e-commerce transaction or an online banking transaction. The user may speak a command to the secondary voice controlled assistant, which transmits the command to the primary voice controlled assistant or directly to the remote system hosting the e-commerce or banking transaction. Audio responses from the transaction may be transmitted to the primary assistant for output over the speaker.

In some cases, as part of the transaction, the user may be asked to enter a code, such as a personal identification number (PIN), social security number (SSN), driver's license, account number, verification identifier, and so forth. Verbal entry of this code may not be suitable in some situations where privacy is a concern, such as when other people are near to the user. In these situations, the control knob is used to facilitate non-verbal entry of the code. For instance, the user may enter the code through a series of rotations of the control knob (e.g., right 5 positions, left 9 positions, and so forth). The user may know the code already, or be provided with a code during the transaction, such as receiving a transaction-specific code to an application executing on a separate communication device associated with the user (e.g., smart phone, personal digital assistant, tablet, etc.).

During operation of the system, all of the assistants may detect the user's verbal input. In some cases, audio may be currently played out over the speakers of the primary assistant. In such situations, a reference signal is shared among the distributed assistants so that accurate acoustic echo cancellation may be performed to more cleanly capture the verbal input. In some cases, the assistants are equipped with synchronization logic to synchronize the devices for improved echo cancellation. Once the verbal input is received by each of the assistants, signal representations of the verbal input, post echo cancellation, are provided to the primary voice controlled assistant for determination of the best signal. This determination may be based on any number of factors, including time-of-arrival, signal-to-noise ratio, utterance recognition confidence, and so forth.

Furthermore, in some contexts, audio feedback may not be suitable. For instance, when the user is in the midst of a conversation, an audio signal or indication may be inappropriate because it interrupts the conversation, or may even go undetected by the user. Accordingly, each voice controlled assistant has a light indicator to convey visual, non-audio messages or feedback to the user. The light indicator may be configured to provide multiple different types of indications. In one implementation, the light indicator is constructed to emit multi-color light from multiple segments according to any on/off, intensity differences, or animation/sequencing pattern, thereby providing an essentially unlimited variety of indications.

Accordingly, the distributed voice controlled system, with multiple assistants configured to communicate wirelessly with one another, are able to perform many different functions. Examples of these functions might include distributed audio input, distributed processing (such as speech processing or echo cancellation), hierarchical storage across assistants, coordinated visual output, and so on.

The architecture may be implemented in many ways. Various example implementations are provided below. However, the architecture may be implemented in many other contexts and situations different from those shown and described below.

FIG. 1 shows an illustrative architecture 100, set in an exemplary environment 102. The architecture 100 includes a distributed voice controlled system 104 having a primary assistant 106 and one or more secondary assistants 108. In this example, the environment may be a room or an office, and a user 110 is present to interact with the voice controlled system 104. Although only one user 110 is illustrated in FIG. 1, multiple users may use the voice controlled system 104. The user 110 may be located proximal to one or more of the assistants 106 and 108, and hence serve as a near end talker in some usage contexts described herein.

In this illustration, the primary voice controlled assistant 106 is physically positioned on a table within the environment 102. The primary voice controlled assistant 106 is shown sitting upright and supported on its base end. The secondary assistant 108 is placed on a cabinet or other furniture and physically spaced apart from the primary assistant 106. In other implementations, the primary assistant 106 and secondary assistant 108 may be placed in any number of locations (e.g., ceiling, wall, in a lamp, beneath a table, on a work desk, in a hall, under a chair, etc.). The assistants 106 and 108 may be placed in the same room or in separate rooms. When in the same room, the two assistants 106 and 108 may be placed in different areas of the room to provide greater coverage of the room. Furthermore, although only one secondary assistant 108 is illustrated, there may be multiple secondary assistants as part of the system 104.

The assistants 106 and 108 are configured to communicate with one another via one or more wireless networks, such as Bluetooth, Wi-Fi, Wi-Fi direct, or the like. Each of the voice controlled assistants 106 and 108 is also shown communicatively coupled to remote entities 111 over a network 112. The remote entities 111 may include individual people, such as a person 114, or automated systems (not shown) that serve as far end talkers to verbally interact with the user 110. The remote entities 111 may alternatively comprise cloud services 116 hosted, for example, on one or more servers 118(1), . . . , 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process the user input received from the voice controlled assistant 104, and produce a suitable response. Example applications might include web browsing, online shopping, banking, bill payment, email, work tools, productivity, entertainment, educational, and so forth.

In FIG. 1, the user 110 is shown communicating with the remote entities 111 via the voice controlled system 104. In the illustrated scenario, the user 110 is speaking in the direction toward the secondary assistant 108, and asking an audible question, "What's the weather?", as represented by the dialog bubble 120. The secondary assistant 108 is equipped with an array 124 of microphones 126(1), . . . , 126(M) to receive the voice input from the user 110 as well as any other audio sounds in the environment 102. The microphones 126(1)-(M) are generally arranged at a first or top end of the assistant 108 opposite the base end seated on the cabinet, as will be described below in more detail with reference to FIGS. 5-7. Although multiple microphones are illustrated, in some implementations, the secondary assistant 108 may be embodied with only one microphone.

The secondary assistant 108 may further include computing components 128 that process the voice input received by the microphone array 124 and enable communication with the remote entities 111 over the network 112. The computing components 128 may include speech recognition, natural language processing, echo cancellation, noise reduction, and the like to enable speech processing. One example collection of computing components 128 is illustrated and described with reference to FIG. 2. A wireless interface (I/F) 130 is also provided to facilitate connection to and data transmission over a wireless network.

The user's verbal question regarding the weather may be processed by the computing components 128 in whole or in part. In some cases, some or all of the speech processing is performed by remote resources, either at the primary voice controlled assistant 104 or at the cloud services 116. Accordingly, in one implementation, the secondary assistant 108 may send the audio input, or a partial processed version of it, to the primary voice controlled assistant 106 where the audio is more fully processed. In this implementation, the primary assistant 106 sends the request to the cloud services 116 for a response to the user's weather inquiry. In another implementation, the secondary assistant 108 may send the weather inquiry directly to the cloud services 116.

In some cases, the primary assistant 108 may receive audio input from multiple secondary assistants, as well as audio it received from its own microphones, all originating from the same sound source. In these situations, the primary assistant 108 may analyze the various audio inputs and select the best audio input to send to the cloud services for further processing. For example, primary assistant 108 may assess each of the audio streams according to one or more metrics including, for example, time-of-arrival, signal-to-noise ratio, confidence in utterance detection, and so on.

The primary assistant 108 may also be emitting an audio sound from time-to-time, such as music or speech from the far end person 114. In these cases, the primary assistant 106 shares a reference signal for the output audio sound among the distributed secondary assistants 108 so that accurate acoustic echo cancellation may be performed at the secondary assistants. In such cases, the assistants are equipped with synchronization logic to synchronize the devices for improved echo cancellation.

The cloud services 116 process the request and generate a response that is capable of being audibly output to the user 110. In this scenario, the response is transmitted to the primary voice controlled assistant 106. Like the secondary assistant 108, the primary assistant 106 is configured with an array 132 of microphones 134(1), . . . , 134(N) to receive the voice input from the user 110, computing components 136, and a wireless interface 138. The computing components 128 are further capable of generating the audio to be output. Unlike the secondary assistant, the primary voice controlled assistant is further equipped with include a speaker array 140 of speakers 142(1), . . . , 142(P) to output sounds in humanly perceptible frequency ranges. The speakers 142(1)-(P) may be configured to emit sounds at various frequency ranges, so that each speaker has a different range. In this manner, the assistant 106 may output high frequency signals, mid frequency signals, and low frequency signals. The speakers 142(1)-(P) are generally arranged at a second or base end of the assistant 106 and oriented to emit the sound in a downward direction toward the base end and opposite to the microphone array 132 in the top end. One particular arrangement is described below in more detail with reference to FIG. 7. Although multiple speakers are illustrated, the assistant 106 may be embodied with only one speaker in other implementations.

Upon receipt of the response from the cloud services, the voice controlled assistant 106 outputs an audible response to the user question about the weather. Here, the response is "64 degrees. Sunny and clear." This audio output is represented by dialog bubble 144. In some implementations, the primary voice controlled assistant 106 is equipped with a text-to-speech (TTS) engine that generates voice audio output from text-based content received from the remote entities 111. This TTS engine may, in other implementations, be located at the remote entities 111 to convert the text content to an audio output signal, which is then transmitted to the voice controlled assistant 104. In other implementations, the audio output may be representative of a verbal response from a far end talker 114.

Accordingly, the distributed voice controlled system 104 allows the user to interact with local and remote computing resources predominantly through speech. By placing the primary assistant and one or more secondary assistants throughout the environment 102, the distributed voice controlled system 104 enables the user to move about his or her home and interact with the system regardless of where located. With multiple points to receive speech input, the audio speech signals can be detected and received more efficiently with higher quality, minimizing the problems associated with location and orientation of the speaker relative to the audio input devices.

Further, by enabling wireless communication among the various assistants, the distributed voice control system 104 may coordinate the various assistants to perform many different functions, including distributed audio input, synchronization for echo cancellation, distributed processing (such as speech processing), hierarchical storage, visible display output, and so on. For instance, in the example scenario of FIG. 1, the secondary assistant 108 may only be configured with only near field communication (e.g., Bluetooth) and communicates messages to the remote entities via use of the wireless I/F of the primary assistant 106. In another example involving distributed processing, the primary assistant 106 may be primarily dedicated to processing audio input, leaving the secondary assistant to have more available processing resources to handle tasks for the primary assistant. For instance, the secondary assistant 108 may offer additional processing resources for rigorous tasks of audio compression or echo cancellation. In still other situations, the assistants may be configured with different types and sizes of memory, allowing a storage protocol to be set up that distributes storage tasks among the various assistants. As one more example, the lighting elements on the various assistants may be coordinated for decorative or informational purposes.

Figure 2:
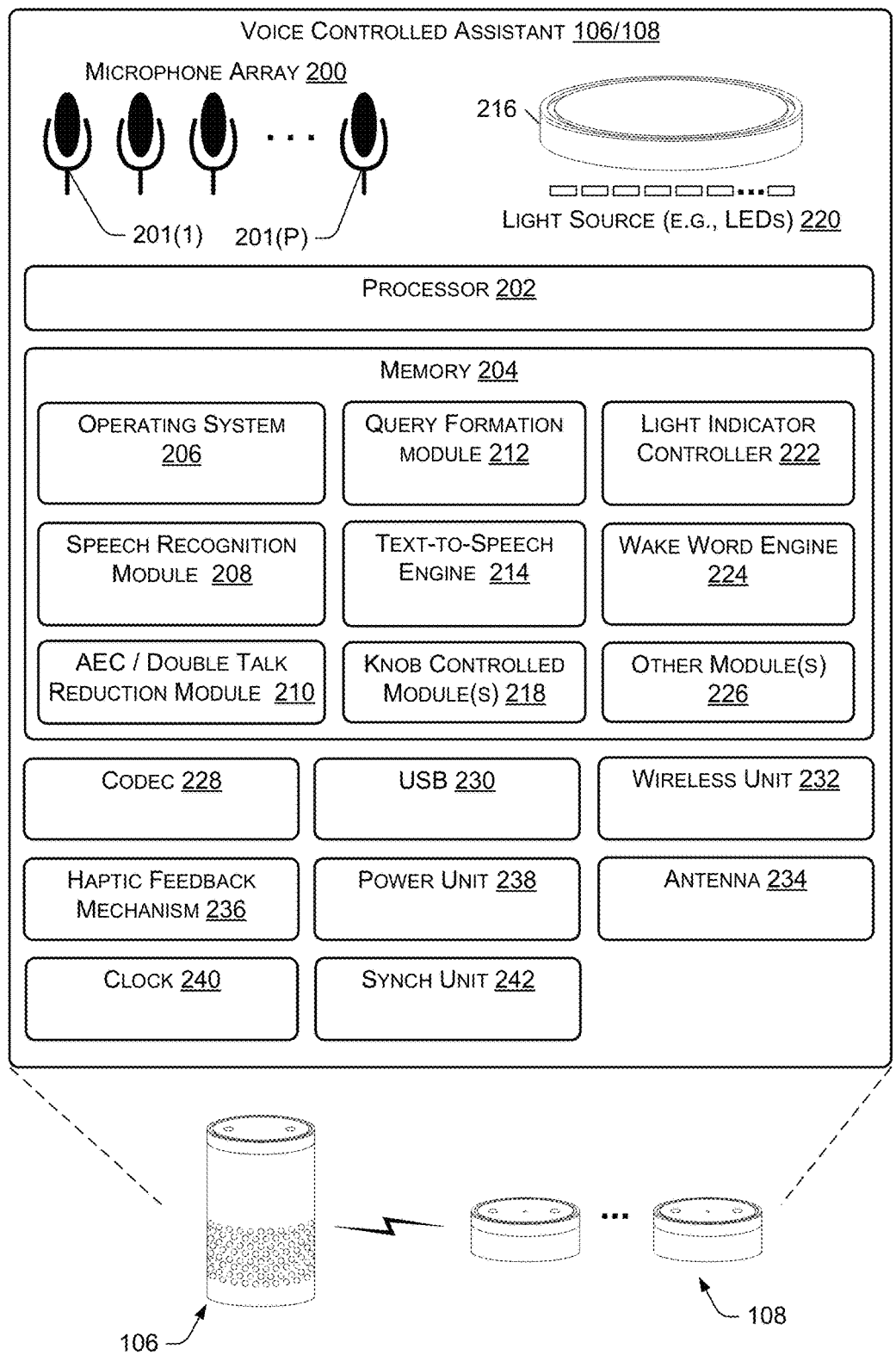
FIG. 2 shows a block diagram of selected functional components implemented in various assistants of the distributed voice controlled system of FIG. 1.

FIG. 2 shows selected functional components of the voice controlled assistants 106 and 108 in more detail. Generally, each of the voice controlled assistants 106 and 108 may be implemented as a standalone device that is relatively simple in terms of functional capabilities with limited input/output components, memory, and processing capabilities. For instance, the voice controlled assistants 106 and 108 may not have a keyboard or keypad. Nor do they have a display or touch screen to facilitate visual presentation and user touch input. Instead, the assistants 106 and 108 may be implemented with microphones to receive audio, a network interface (wireless or wire-based), power, and limited processing/memory capabilities. Further, the primary assistant 106 is equipped with one or more speakers for audio output.

Each voice controlled assistant 106/108 has a microphone array 200 of individual microphones 201(1), . . . , 201(P). The microphones receive audio input including speech from the user and ambient/background noise.

Each voice controlled assistant 106/108 includes a processor 202 and memory 204. The processor 202 may be implemented as any form of processing component, including a microprocessor, control logic, application-specific integrated circuit, and the like. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., wireless unit, USB, Codec) within and coupled to the assistant for the benefit of other modules. Several other modules may be provided to process verbal input from the user 110. For instance, a speech recognition module 208 provides some level of speech recognition functionality. In some implementations, this functionality may be limited to specific commands that perform fundamental tasks like waking up the device, configuring the device, and the like. The amount of speech recognition capabilities implemented on the assistant 106/108 is an implementation detail, but the architecture described herein can support having some speech recognition at the local assistant together with more expansive speech recognition at the cloud services 116.

An acoustic echo cancellation (AEC) and noise reduction module 210 is provided to process the audio signals to substantially cancel acoustic echoes and substantially reduce noise that may occur. This module 210 may, for example, identify times where echoes are present, where double talk is likely, where background noise is present, and attempt to reduce these external factors to isolate and focus on the near talker. By isolating on the near talker, better signal quality is provided to the speech recognition module 208 to enable more accurate interpretation of the speech utterances. The AEC module 210 of the secondary assistants 108 may use a reference signal provided by the primary assistant 106.

A query formation module 212 may also be provided to receive the parsed speech content output by the speech recognition module 208 and to form a search query or some form of request. This query formation module 212 may utilize natural language processing (NLP) tools as well as various language modules to enable accurate construction of queries based on the user's speech input. In other implementations, this functionality is hosted in the cloud services 116.

For the primary assistant with speakers for audio output, a text-to-speech (TTS) engine 214 is provided to convert textual or other forms of data into an audio signal that can be output by a speaker. Responses received from the cloud services 116 may be transmitted to the primary assistant 106 in a data format that can be converted by the engine 214 into an audible output.

In some implementations, each assistant 106/108 has a control knob 216 that permits manual input for various assignable activities, such as volume, treble, base, radio band selection, menu navigation, and so forth. The control knob 216 permits manual adjustment without use of verbal commands. For instance, the user can adjust volume while conducting a contemporaneous verbal conversation. Furthermore, the control knob 216 may be used to facilitate non-verbal entry of codes. For instance, suppose the user engages in an e-commerce or banking transaction. As part of these transactions, the user may be asked to enter a code to verify the transaction. The user may manually turn the control knob 216 through a series of rotations to enter the code. This non-verbal input allows the user to enter the code without saying the code out loud to the assistant. The control knob is described below in more detail with reference to FIGS. 3-6.

One or more knob controlled modules 218 may also be stored in the memory 204 to receive control signals from a rotary transducer associated with the control knob 216 and modify operation of corresponding applications or functionality. Examples of knob-controlled modules 218 may include modules that facilitate volume control, other audio control (e.g., base, treble, etc.), menu navigation, radio band selection, and so forth.

Each voice controlled assistant 106/108 may further include a light indicator 220 to provide non-audio, visual indications to the user. In one implementation, the light indicator 220 is integrated with the control knob 216, such as a light edge pipe around an externally exposed lip or peripheral edge of the control knob 216 to permit viewing from all directions. The light indicator 220 may be configured with multiple LEDs to provide multiple colored light segments that can be actively controlled to exhibit essentially any color, sequence, or effect.

A light indicator controller 222 may be implemented to execute on the processor 202 to assign various functions to corresponding indication states exhibited by the light indicator 220. More specifically, the light indicator controller 222 individually controls each of the LEDs to provide any number of visual appearances for the light indicator 220. The light indicator controller determines which of the LEDs 220 to illuminate, when individual LEDs should be illuminated, their respective color, and whether to apply a pattern or animation effect.

Various functions or activities may be programmatically associated with different indication or appearance states of the light indicator 220. For instance, the light indicator 220 may take on a first appearance (e.g., solid green color) when the assistant 104 is active and awaiting input, and a second appearance (e.g., solid red color) when a pending message has been received. The light indicator 220 may further produce a third appearance (e.g., flashing color) when providing a notice or warning to the user and a fourth appearance (e.g., sequential clockwise/counterclockwise on/off pattern) when the user is adjusting the control knob. The light indicator 220 may further produce a fifth appearance involving animation of the light indicator when, for example, the assistant recognizes a wake word pre-defined to wake up the assistant for operation. Other examples of possible events that may be assigned to various appearances of the light indicator include alerts, reminders, calendar events, call waiting, arrival of a message (e.g., voicemail, email, text, etc.), mute on/off, recording active, security event (e.g., detecting a presence of an intruder through audible sound), amplitude of speaker's voice, direction of voice source, power, connection to a Wi-Fi network, weather (e.g., temperature, pressure, etc.), timer, and so forth. Moreover, the light indicator 220 may be used to help the user enter a code. For instance, the light indicator 220 may be configured to provide a spectrum of colors from a first color when the knob is first used through one or more other colors a as the knob is turned. In such configurations, a code may be color based, such as a sequence of colors (e.g., rotate the knob right and left to achieve a color sequence of Yellow-Red-Blue-Green).

In one implementation, the primary and secondary assistants are coordinated so that the light indicators exhibit the same indicator state. For instance, when the user places one assistant in a mute state, the light indicator on that assistant is illuminated with an appearance to indicate mute. Concurrently, this assistant informs the other assistants in the system of this condition and the other assistants transition to a mute state and illuminate their respective light indicators to the same indicator state.

A wake word engine 224 may also be included as a software or firmware module stored in the memory 204 for execution on the processor(s) 202. The wake word engine 224 is coupled to receive signal representations of any audio captured by the microphones. The wake word engine 224 processes the audio to evaluate whether the audio contains pre-defined utterances or words that are intended to activate or otherwise control the assistant. For instance, assistant may be in a low power state until the user speaks a word intended to wake up the assistant into a full power state. The wake word engine 224 detects the wake word.

The modules shown stored in the memory 204 are merely representative. Other modules 226 for processing the user voice input, interpreting that input, and/or performing functions based on that input may be provided. As one example, the other modules may include a code analyzer coupled to receive the data or signal generated by rotation of the knob 216 and to interpret the knob movement as values or portions of a code. As the user turns the knob right to a particular position or a number of times or until a particular color is shown, the code analyzer analyzes the movement in the context of the why the code is being used. Based on this analysis, the code analyzer determines a string of values or portions that form a complete code. The code analyzer may then verify the code locally, or sent the code to the remote entities 111 for verification.

Each voice controlled assistant 104/108 might further include a codec 228 coupled to the microphones of the microphone array 200 (and any speakers of the speaker array 140 in the case of the primary assistant) to encode and/or decode the audio signals. The codec 228 may convert audio data between analog and digital formats. A user may interact with each assistant 106/108 by speaking to it, and the microphone array 200 captures the user speech. The codec 228 encodes the user speech and transfers that audio data to other components. The primary assistant 106 can communicate back to the user by emitting audible statements passed through the codec 228 and output through the speaker array 140. In this manner, the user interacts with the voice controlled assistant simply through speech, without use of a keyboard or display common to other types of devices.

A USB port 230 may further be provided as part of each assistant 106/108 to facilitate a wired connection to a network, or a plug-in network device that communicates with other wireless networks. In addition to the USB port 230 or as an alternative thereto, other forms of wired connections may be employed, such as a broadband connection.

Each voice controlled assistant 106/108 includes a wireless unit 232 coupled to an antenna 234 to facilitate a wireless connection to a network. The wireless unit 232 may implement one or more of various wireless technologies, such as Wi-Fi, Bluetooth, RF, and so on. In one implementation, the wireless unit 232 configured with a short range wireless technology (e.g., Bluetooth) may be used to communicate with other local devices, such as the user's personal communication device (e.g., portable digital assistant, cellular phone, smart phone, etc.). As one example, a voice communication device may be proximal to one of the voice controlled assistants 106/108 and communicate with the assistant using a Bluetooth connection. When the communication device receives a call, the call may be transferred to the voice controlled assistant to facilitate the conversation with the user. As part of this incoming call, the calling party may be identified and that identity is used by the voice controlled assistant to illuminate the light indicator in a visually customized way that informs the user of the calling party. Additionally, the intended recipient may be identified and the assistant 104 may illuminate the light indicator in a different appearance state associated with the recipient. In this manner, the light indicator functions as a caller ID.

Each voice controlled assistant 106/108 may further be equipped with a haptic feedback mechanism 236 which provides touch perceivable feedback to the user during operation of the control knob 216. As one example implementation, the haptic feedback mechanism 236 may be configured to simulate the feel of rotating a combination lock on an old-fashion safe. Each rotation increment is marked by a vibration intended to resemble a familiar clicking sensation as the user turns the combination lock. In some implementations, the primary voice controlled assistant 106 may concurrently emit subtle but audible clicking sounds to further simulate a safe.

A power unit 238 is further provided to distribute power to the various components on the assistant 104.

Each assistant is further equipped with a clock 240 that may be used in synchronizing the devices. To effectively perform echo cancellation, the primary assistant 106 shares a reference signal (e.g., the music being played back through the speakers) with the secondary assistants 108 for acoustic echo cancellation. However, the assistants are all independent with separate clocks and crystals that introduce some timing differences. Further, the independent assistants communicate via a wireless connection, which may introduce other variable timing delays. Accordingly, each assistant has synchronization logic in unit 242 to share synchronization information to prevent relative time drift among the assistants. The synchronization unit 242 exchanges synchronization information to routinely realign the clocks relative to one another, thereby improving AEC processes.

Both the primary and secondary voice controlled assistants 106 and 108 are designed to support audio interactions with the user, in the form of receiving voice commands (e.g., words, phrase, sentences, etc.) from the user. The primary assistant 106 is further designed to output audible feedback to the user. Accordingly, in the illustrated implementation, there are no keypads, joysticks, keyboards, touch screens, and the like. Further, there is no display for text or graphical output. In one implementation described below, the voice controlled assistant 104 includes a few control mechanisms, such as the knob 216, two actuatable buttons, and possibly power and reset buttons. But, otherwise, each assistant 106/108 relies primarily on audio interactions.

Accordingly, the assistants 106/108 may be implemented as aesthetically appealing devices with smooth and rounded surfaces. In the illustrated implementation, the assistant 104 has a housing of an elongated cylindrical shape. A more detailed discussion of example structures is provided below with reference to FIGS. 3-7. Once plugged in, the device may automatically self-configure, or with slight aid of the user, and be ready to use. As a result, the assistant 104 may be generally produced at a low cost. In other implementations, other I/O components may be added to this basic model, such as additional specialty buttons, a keypad, display, and the like.

Figure 3:
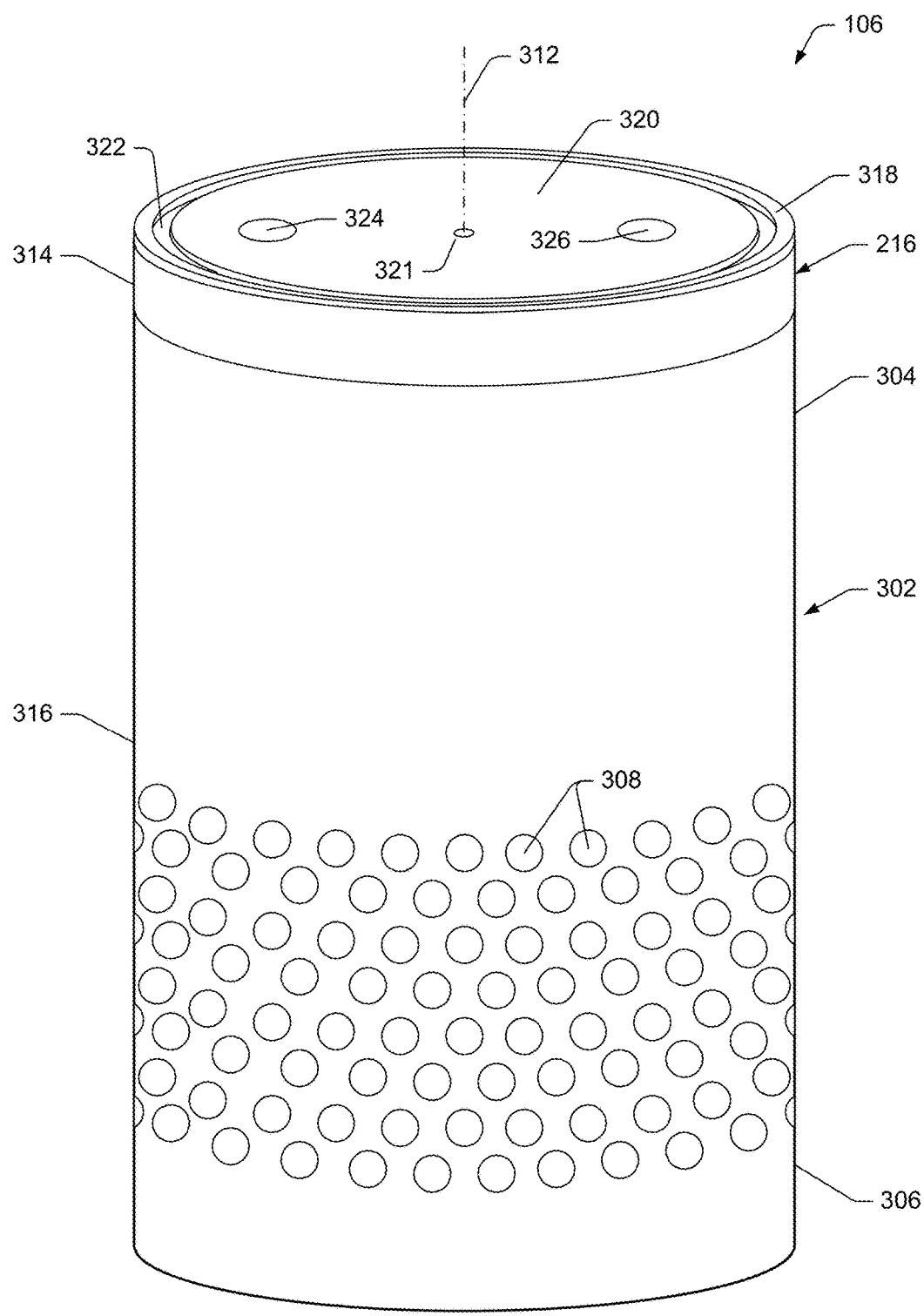
FIG. 3 is a perspective view of one implementation of a primary voice controlled assistant having microphones for voice input and one or more speakers to output audio.

FIG. 3 is a perspective view of one example implementation of the primary voice controlled assistant 106. The assistant 106 has a cylindrical body or housing 302 with an upper or top end 304 and a lower or base end 306. The base end 306 of the housing 302 has multiple openings or apertures 308 to permit emission of sound waves generated by the speakers (not shown in FIG. 3) contained within the housing. In other implementations, the openings 308 may be in other locations, such as a band about the middle of the cylindrical housing or closer to the top end 304. The openings 308 may be arranged in any layout or pattern, essentially anywhere on the device, depending in part on the location of the one or more speakers housed therein.

One implementation of the control knob 216 is illustrated in FIG. 3 as an annular wheel-like knob mounted near the top end 304 of the housing 302 to rotate about a center axis 312 of the cylindrical body defining the housing. The knob 216 has a smooth outer surface 314 that is substantially vertically and radially flush with an outer surface 316 of the housing 302. For instance, the housing's outer surface 316 is at a first radius from the center axis 312 and the knob's outer surface 314 is at a second radius from the center axis 312, and the first and second radii are approximately equal. In this manner, the knob 216 maintains the smooth cylindrical shape of the housing 302 to promote an elegant design where the knob 216 seamlessly integrates with the cylindrical housing 302 and does not conspicuously stand out as a separate appendage. Additionally, the knob 216 enjoys a large diameter to permit more precise mechanical movement and control. The knob 216 may be infinitely rotatable in either direction, with no mechanical limit for clockwise or counterclockwise rotation. As a result, a user may easily and finely control various functions by grasping and turning the knob 216 or by using a finger to rotate the knob 216.

The knob 216 has an upper peripheral edge that is fitted with an edge pipe 318, which may be used as an annular signaling indicator. The edge pipe 318 is a light pipe that is used to channel light emitted by the light source 220. The edge pipe 318 is formed of a light transmissive material that may receive light from the light source 220 (e.g., one or more LEDs) so that the edge pipe 318 may be illuminated. Due to its location at the top end 304, the edge pipe 318, when illuminated, is visible from all directions and may be easily seen in the dark to aid in user operation of the knob 216. The edge pipe 318 may be illuminated using a single color or many different colors. Similarly, the pipe 318 may be illuminated as a solid annular ring or as individual segments. The segments may even be controlled in a way to provide an animated appearance (e.g., flashing segments, turning segments on/off in a pattern, differing intensities of light emitted by the LEDs, etc.). The various appearances may be assigned to different functions, such as to differentiate rest mode from operational mode, or to communicate different states of operation (e.g., when in mute or privacy), or to communicate different types of functionality (e.g., receiving or storing a message), or to illustrate associated knob operation (e.g., illuminating more segments as the user turns the knob), and so forth.

The knob 216 rotates around a circular end cap 320, which remains stationary. The circular end cap 320 may be formed of a hard, protective material, such as plastic. In such implementations, a center hole 321 may be provided in the end cap 320 to permit sound transmission to one or more microphones positioned beneath the end cap 320. Alternatively, the end cap 320 may be formed of a material that is transmissive to sound waves, as one or more microphones may be placed beneath the surface. In one implementation, a groove 322 is formed between the edge pipe 318 of the knob 216 and the end cap 320. The groove 322 recesses into the assistant from the outer surface formed by the end cap 320. The groove 322 may be, for example, at a depth of 1 mm to 5 mm, with 2 mm being one example suitable distance. In still another implementation, a sound transmissive material, such as a mesh, may be used to cover the groove 322 or components, such as microphones, positioned in the groove.

Two actuatable buttons 324 and 326 are exposed through corresponding openings in the end cap 320. These buttons 324 and 326 may be implemented, for example, with on/off states and may be assigned to control essentially any binary functionality. In one implementation, the left button 324 may be used to enable/disable the microphones (i.e., place the assistant in a privacy mode) and the right button 326 may be used for any other assignable function. The buttons 324 and 326 may be configured with different tactile profiles (e.g., different surfaces, shapes, texture, etc.) to exhibit different tactile experiences for the user, so that the buttons may be identified in low or dark lighting conditions simply through touch. The buttons may also be configured to be illuminated for easy viewing in low or dark lighting conditions.

In one implementation, the buttons 324 and 326 on one assistant may control similar activity on other assistants. For example, one button 324 may be implemented as a microphone on/off control. Depressing this button 324 on one assistant effectively turns off all microphones throughout the voice controlled system. In other implementations, activation of one button ma only impact operation of the associated assistant. For instance, suppose the button 326 is configured as a multi-function button with more states than on/off. Activation of the multi-function button 326 may only affect operation of the associated assistant. As an example, a long continuous press of the multi-function button 326 may initiate a Bluetooth or Wi-Fi pairing on the associated assistant, but not initiate such an operation on other assistants in the system. Other examples of the multi-function buttons include starting and stopping an interaction with the cloud services, stopping a timer or alarm, answering a call, putting the assistant in a configuration mode, and placing the assistant in a data collection mode.

One or more microphones may be positioned in the groove 322. There are many possible arrangements of the microphones in the microphone array. In one implementation, the assistant 106 is equipped with six microphones in the groove 322 between the knob 216 and the end cap 320 and a seventh microphone is positioned centrally at the axis 312 beneath the surface of the end cap 320. If the end cap 320 is formed of a hard, protective plastic, an aperture or opening 321 may be formed at the center point above the seventh microphone. Alternatively, a pattern of holes may be stamped into the plastic end cap 320 to generally permit passage of sound waves to the underlying microphones.

Figure 4:
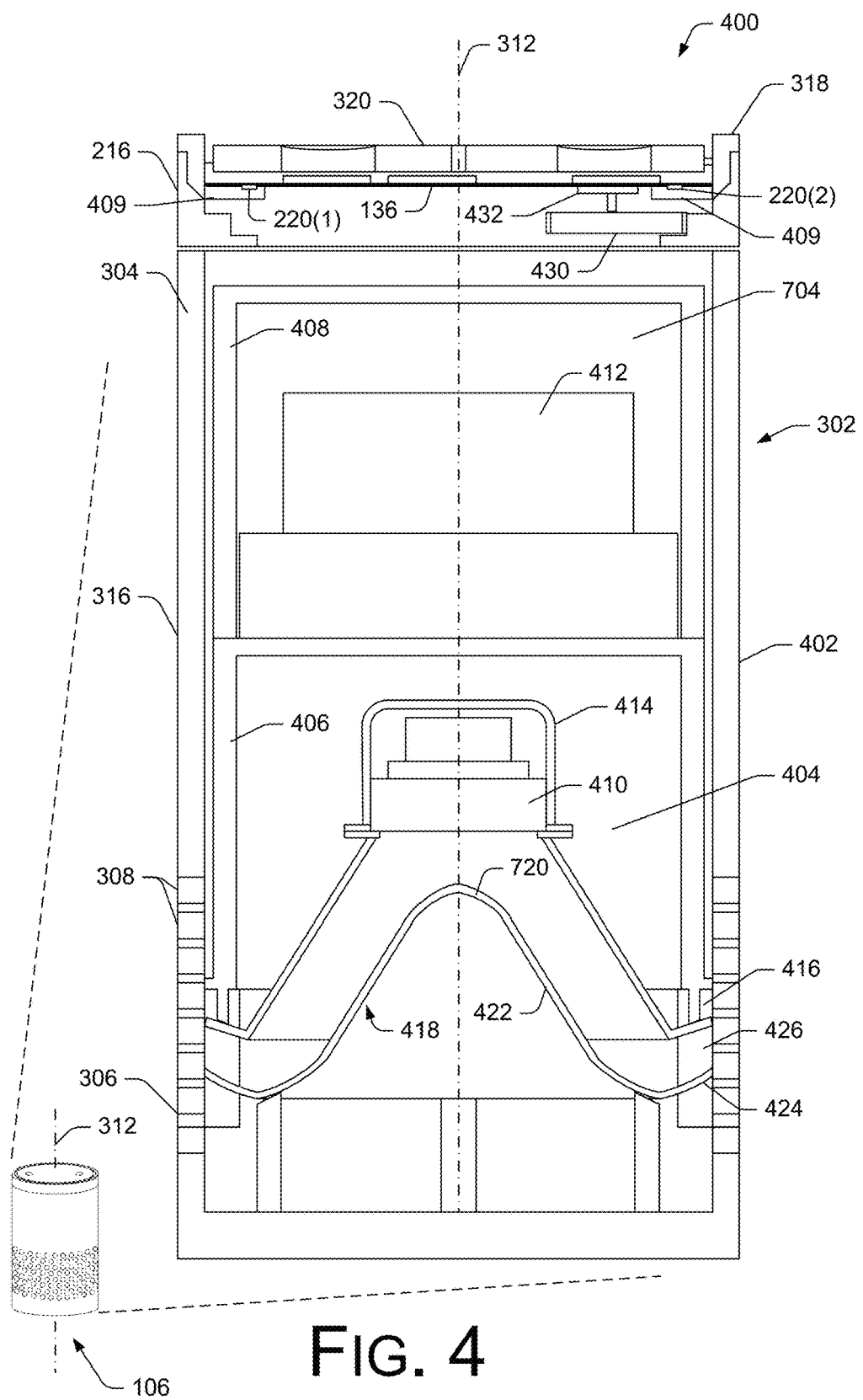
FIG. 4 is a cross sectional view of the primary voice controlled assistant of FIG. 3 according to one example implementation in which two speakers are coaxially aligned.

FIG. 4 is a cross sectional view 400 of the primary voice controlled assistant 106 taken along a plane that intersects the center axis 312 of the cylindrical-shaped housing 302. The housing 302 has an elongated, cylindrical-shaped middle section 402 extending between the first, lower or base end 306 and a second, upper, or top end 304. The cylindrical-shaped middle section 402 has a smooth outer surface 316 and due to the rounded shape, the two ends 304 and 306 are circular in shape. The base end 306 is designed to rest on a surface, such as a table 108 in FIG. 1, to support the housing 302. In this position, the top end 304 is distal and upward relative to the base end 306.

The housing 302 defines a hollow chamber 404. Within this chamber 404 are two skeletal members: a first or lower skeletal member 406 that provides structural support for components in the lower half of the chamber 404 and a second or upper skeletal member 408 that provides structural support for components in the upper half of the chamber 404.

The computing components 136 are mounted to the upper skeletal member 408, with one example configuration having the components mounted on a printed circuit board (PCB) positioned just below the end cap 320. The computing components 136 may include any number of processing and memory capabilities, as well as power, codecs, network interfaces, and so forth. Example components are shown in FIG. 2. The PCB may further hold the microphones 134(1)-(N), which are not shown in FIG. 4. It is noted that some or all of the computing components 136 may be situated in other locations within the housing 302.

A light source 220 for the edge pipe 318 may be mounted to the PCB. In one implementation, the light source 220 may be formed as multiple (e.g., 12) multi-colored light sources, such as RGB LEDs. In FIG. 4, two LEDs 220(1) and 220(2), are shown mounted to the PCB 136 and optically connected to a light pipe diffusion ring 409, which is also mounted to the PCB. The light pipe diffusion ring 409 is optically coupled to the edge pipe 318. In this manner, each of the LEDs 220 may emit light in various colors, which is conveyed through the diffusion ring 409 to the edge pipe 318 exposed on the other rim of the knob 216 so that the light ring can be viewed from all directions. In this configuration, the light indicator is composed the light indicator controller 222, the light source 220, and the optical illumination components of the edge pipe 318 and diffusion ring 409.

Two speakers are shown mounted in the housing 302. A first speaker 410 is shown mounted within the lower skeletal member 406. The first speaker 410 outputs a first range of frequencies of audio sound. In one implementation, the first speaker 410 is a mid-high frequency speaker that plays the middle to high frequency ranges in the human-perceptible audible range. A second speaker 412 is shown mounted within the upper skeletal member 408 elevationally above the first speaker 410 with respect to the base end 306. In this implementation, the second speaker 412 is a low frequency speaker that plays the low frequency ranges in the human-perceptible audible range. The mid-high frequency speaker 410 is smaller than the low frequency speaker 412.

The two speakers 410 and 412 are mounted in a coaxial arrangement along the center axis 312, with the low frequency speaker 412 atop the mid-high frequency speaker 410. The speakers are also coaxial along the center axis 312 to the microphone array, or more particularly, to the plane containing the microphone array. The middle microphone 126(7) (not shown in this figure) is positioned at the center point and lies along the center axis 312. Further, the two speakers 410 and 412 are oriented to output sound in a downward direction toward the base end 306 and away from the microphones mounted in the top end 304. The low frequency speaker 412 outputs sound waves that pass through one or more openings in the lower skeletal member 406. The low frequency waves may emanate from the housing in any number of directions. Said another way, in some implementations, the low frequency speaker 412 may function as a woofer to generate low frequency sound waves that flow omni-directionally from the primary assistant 106.

The mid-high frequency speaker 410 is mounted within a protective shielding 414, which provides a shield to the sound waves emitted from the low frequency speaker 412. Small openings or slots 416 are formed in the lower skeletal member 406 near the base end 306 of the housing 302 to pass sound waves from the chamber 404, although the low frequency waves need not be constrained to these slots.

The mid-high frequency speaker 410 emits mid-high frequency sound waves in a downward direction onto a sound distribution cone 418 mounted to the base end 306. The sound distribution cone 418 is coaxially arranged in the housing 302 along the center axis 312 and adjacent to the mid-high frequency speaker 410. The sound distribution cone 418 has a conical shape with a smooth upper nose portion 420, a middle portion 422 with increasing radii from top to bottom, and a lower flange portion 424 with smooth U-shaped flange. The sound distribution cone 418 directs the mid-high frequency sound waves from the mid-high frequency speaker 410 along the smooth conical surface downward along the middle portion 422 and in a radial outward direction from the center axis 312 along the lower flange portion 424 at the base end 306 of the housing 302. The radial outward direction is substantially perpendicular to the initial downward direction of the sound along the center axis 312. In this manner, the sound distribution cone 418 essentially delivers the sound out of the base end 306 of the housing 302 symmetrical to, and equidistance from, the microphone array in the top end 304 of the housing. The sound distribution cone 418 may also have the effect of amplifying the sound emitted from the mid-high frequency speaker 410.

Slots 426 are formed between the lower skeletal member 406 and the cone 418 to permit passage of the sound waves, and particularly the high frequency sound waves, emitted from the mid-high frequency speaker 410. In addition, apertures 308 are formed in the outer housing 402 to permit emission of the sound waves.

The knob 216 is rotatably mounted at the top end 304 of the housing 302 to rotate about the center axis 312. The knob 216 is mechanically coupled to the complementary gear 430. As the gear rotates, a rotary transducer 432 outputs a signal indicative of that rotation that may be passed to other modules to control various functions.

Although not shown, the haptic feedback mechanism 236 may be connected to provide touch perceptible vibrations or other sensations through the knob 216. In one implementation, a vibration mechanism may be coupled to the internal complementary gear 430. A touch sensation applied to the gear 432 may then be mechanically translated through to the knob 216.

Figure 5:
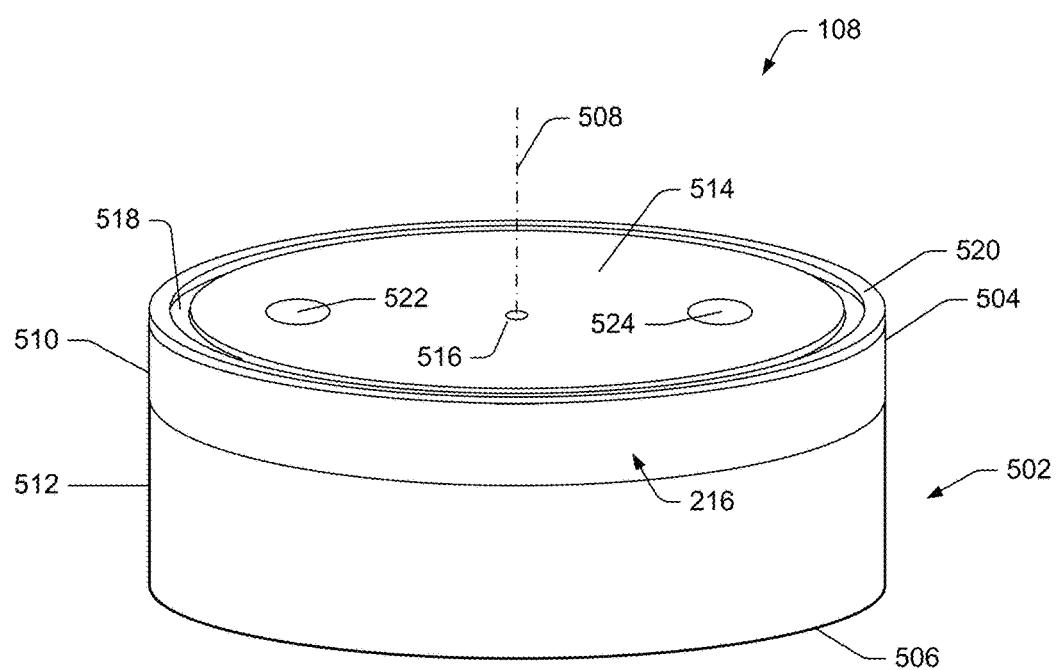
FIG. 5 is a perspective view of one implementation of a secondary voice controlled assistant with that coordinates with the primary voice controlled assistant of FIG. 3 to receive and process speech input, but is void of any speakers.

FIG. 5 is a perspective view of one example implementation of the secondary voice controlled assistant 108. The secondary assistant 108 has a cylindrical body or housing 502 with an upper or top end 504 and a lower or base end 506. Similar to the primary assistant 106, a control knob 216 is mounted near the top end 504 of the housing 502 to rotate about a center axis 508 of the cylindrical body defining the housing. The knob 216 has a smooth outer surface 510 that is substantially vertically and radially flush with an outer surface 512 of the housing 502. For instance, the housing's outer surface 512 is at a first radius from the center axis 408 and the knob's outer surface 510 is at a second radius from the center axis 508, and the first and second radii are approximately equal. In this manner, the knob 216 maintains the smooth cylindrical shape of the housing 502 to promote an elegant design where the knob 216 seamlessly integrates with the cylindrical housing 502 and does not conspicuously stand out as a separate appendage. Additionally, the knob 216 enjoys a large diameter to permit more precise mechanical movement and control. As with the primary assistant 108, the knob 216 may be infinitely rotatable in either direction, with no mechanical limit for clockwise or counterclockwise rotation. As a result, a user may easily and finely control various functions by grasping and turning the knob 216 or by using a finger to rotate the knob 216.

The knob 216 rotates around a circular end cap 514, which remains stationary. The circular end cap 514 may be formed of a hard, protective material, such as plastic. In such implementations, a center hole 516 may be provided in the end cap 514 to permit sound transmission to one or more microphones positioned beneath the end cap 514. Alternatively, the end cap 514 may be formed of a material that is transmissive to sound waves, as one or more microphones may be placed beneath the surface. In one implementation, a groove 518 is formed between the edge pipe 520 of the knob 216 and the end cap 514. The groove 518 recesses into the assistant from the outer surface formed by the end cap 514. The groove 518 may be, for example, at a depth of 1 mm to 5 mm, with 2 mm being one example suitable distance. In still another implementation, a sound transmissive material, such as a mesh, may be used to cover the groove 518 or components, such as microphones, positioned in the groove.

Two actuatable buttons 522 and 524 are exposed through corresponding openings in the end cap 514. These buttons 522 and 524 may be implemented, for example, with on/off states and may be assigned to control essentially any binary functionality. In one implementation, the left button 522 may be used to enable/disable the microphones (i.e., place the assistant in a privacy mode) and the right button 524 may be used for any other assignable function. The buttons 522 and 524 may be configured with different tactile profiles (e.g., different surfaces, shapes, texture, etc.) to exhibit different tactile experiences for the user, so that the buttons may be identified in low or dark lighting conditions simply through touch. The buttons may also be configured to be illuminated for easy viewing in low or dark lighting conditions.

One or more microphones may be positioned in the groove 518. There are many possible arrangements of the microphones in the microphone array. In one implementation, the secondary assistant 108 is equipped with six microphones in the groove 518 between the knob 216 and the end cap 514 and a seventh microphone is positioned centrally at the axis 508 beneath the surface of the end cap 514. If the end cap 514 is formed of a hard, protective plastic, an aperture or opening 516 may be formed at the center point above the seventh microphone. Alternatively, a pattern of holes may be stamped into the plastic end cap 514 to generally permit passage of sound waves to the underlying microphones.

Figure 6:
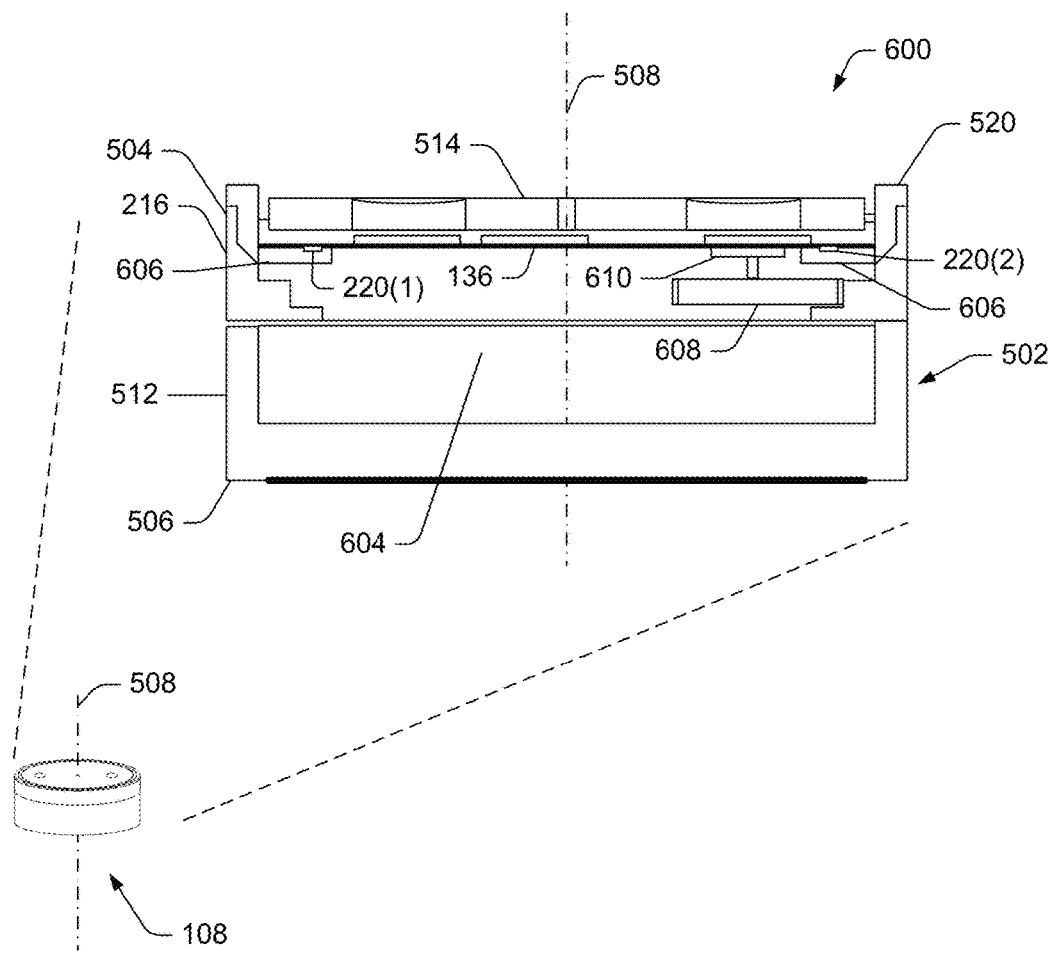
FIG. 6 is a cross sectional view of the secondary voice controlled assistant of FIG. 4 according to one example implementation.

FIG. 6 is a cross sectional view 600 of the secondary voice controlled assistant 108 taken along a plane that intersects the center axis 508 of the cylindrical-shaped housing 502. The housing 502 has an elongated, cylindrical-shaped middle section extending between the first, lower or base end 506 and a second, upper, or top end 504. The cylindrical-shaped middle section has the smooth outer surface 512 and due to the rounded shape, the two ends 304 and 306 are circular in shape. The base end 506 is designed to rest on a surface, such as a table 108 in FIG. 1, to support the housing 502. In this position, the top end 504 is distal and upward relative to the base end 506.

The housing 502 defines a hollow chamber 602. The housing functions as a functional support base for the functional knob 216 and computing components 136. The computing components 136 are mounted to a printed circuit board (PCB) positioned just below the end cap 514. The computing components 136 may include any number of processing and memory capabilities, as well as power, codecs, network interfaces, and so forth. Example components are shown in FIG. 2. The PCB may further hold the microphones 201(1)-(N), which are not shown in FIG. 6. It is noted that some or all of the computing components 136 may be situated in other locations within the housing 502.

A light source 220 for the edge pipe 520 may be mounted to the PCB. In one implementation, the light source 220 may be formed as multiple (e.g., 12) multi-colored light sources, such as RGB LEDs. In FIG. 6, two LEDs 220(1) and 220(2), are shown mounted to the PCB 136 and optically connected to a light pipe diffusion ring 606, which is also mounted to the PCB. The light pipe diffusion ring 606 is optically coupled to the edge pipe 520. In this manner, each of the LEDs 220 may emit light in various colors, which is conveyed through the diffusion ring 606 to the edge pipe 520 exposed on the other rim of the knob 216 so that the light ring can be viewed from all directions. In this configuration, the light indicator is composed the light indicator controller 222, the light source 220, and the optical illumination components of the edge pipe 520 and diffusion ring 606.

The knob 216 is rotatably mounted at the top end 504 of the housing 502 to rotate about the center axis 508. The knob 216 is mechanically coupled to a complementary gear 608. As the gear rotates, a rotary transducer 610 outputs a signal indicative of that rotation that may be passed to other modules to control various functions.

Figure 7:
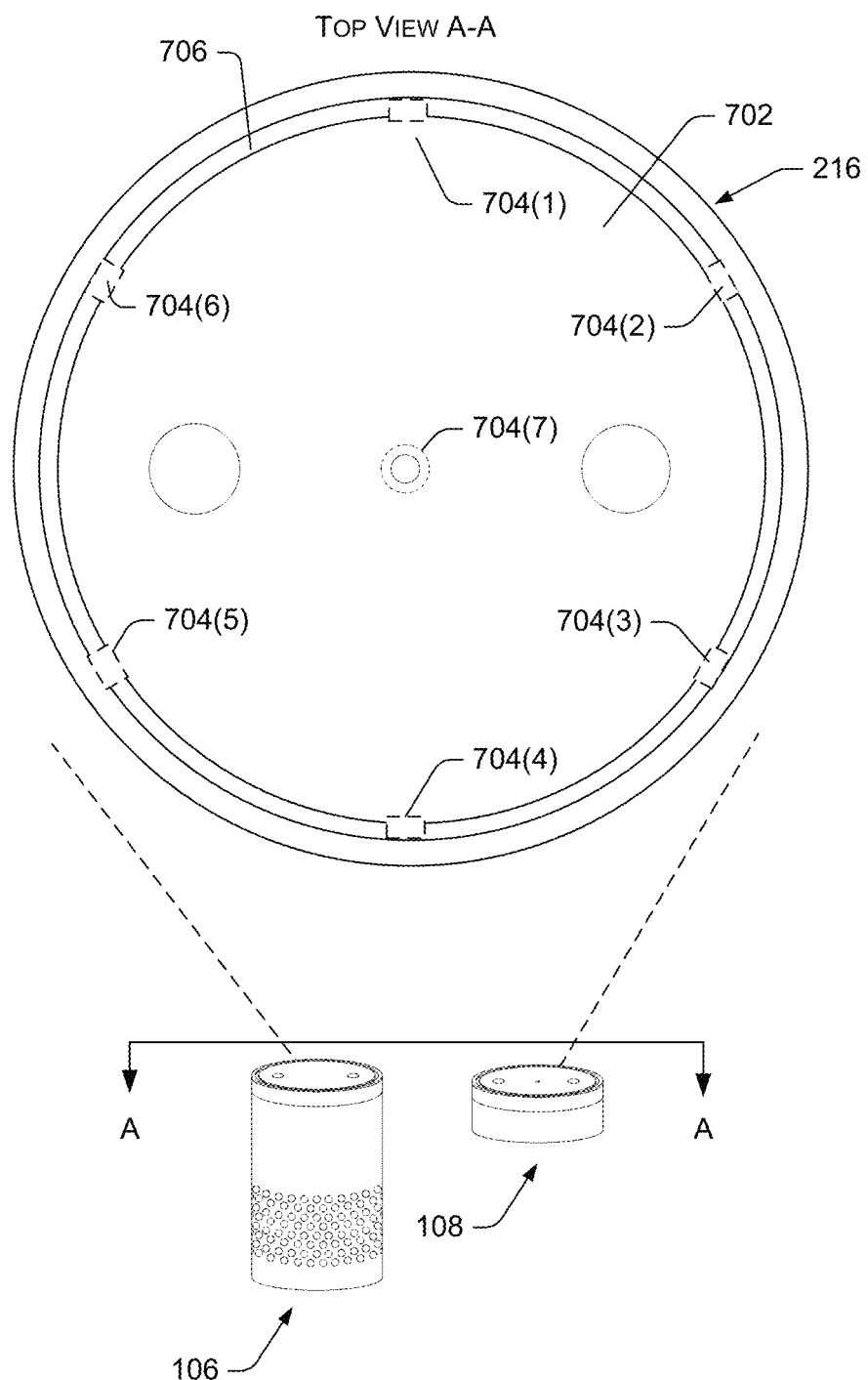
FIG. 7 shows a top down view of the primary and secondary voice controlled assistants to illustrate a light edge pipe arranged on the control knob and an example arrangement of microphones to form a microphone array.

FIG. 7 shows one example arrangement of microphones in the top end of the assistants. FIG. 7 shows a top down view of the voice controlled assistant 106/108 taken along line A-A to illustrate the end cap 702 at the upper end of the housing. In this example, the microphone array has seven microphones 704(1), . . . , 704(7). Six of the microphones 704(1)-(6) are placed within the groove 706 between the perimeter of the end cap 702 and the knob 216, and are oriented so that the microphones are exposed into the groove 706 to receive sound. A mesh or other sound transmissive material may be placed over the microphones to prevent dust or other contaminants from affecting the microphones. A seventh microphone 704(7) is positioned at the center point of the circular end cap 702 and beneath an opening in the end cap 702 or a sound transmissive material. It is noted that this is merely one example arrangement. Arrays with more or less than seven microphones may be used, and other layouts are possible.

Figure 8:
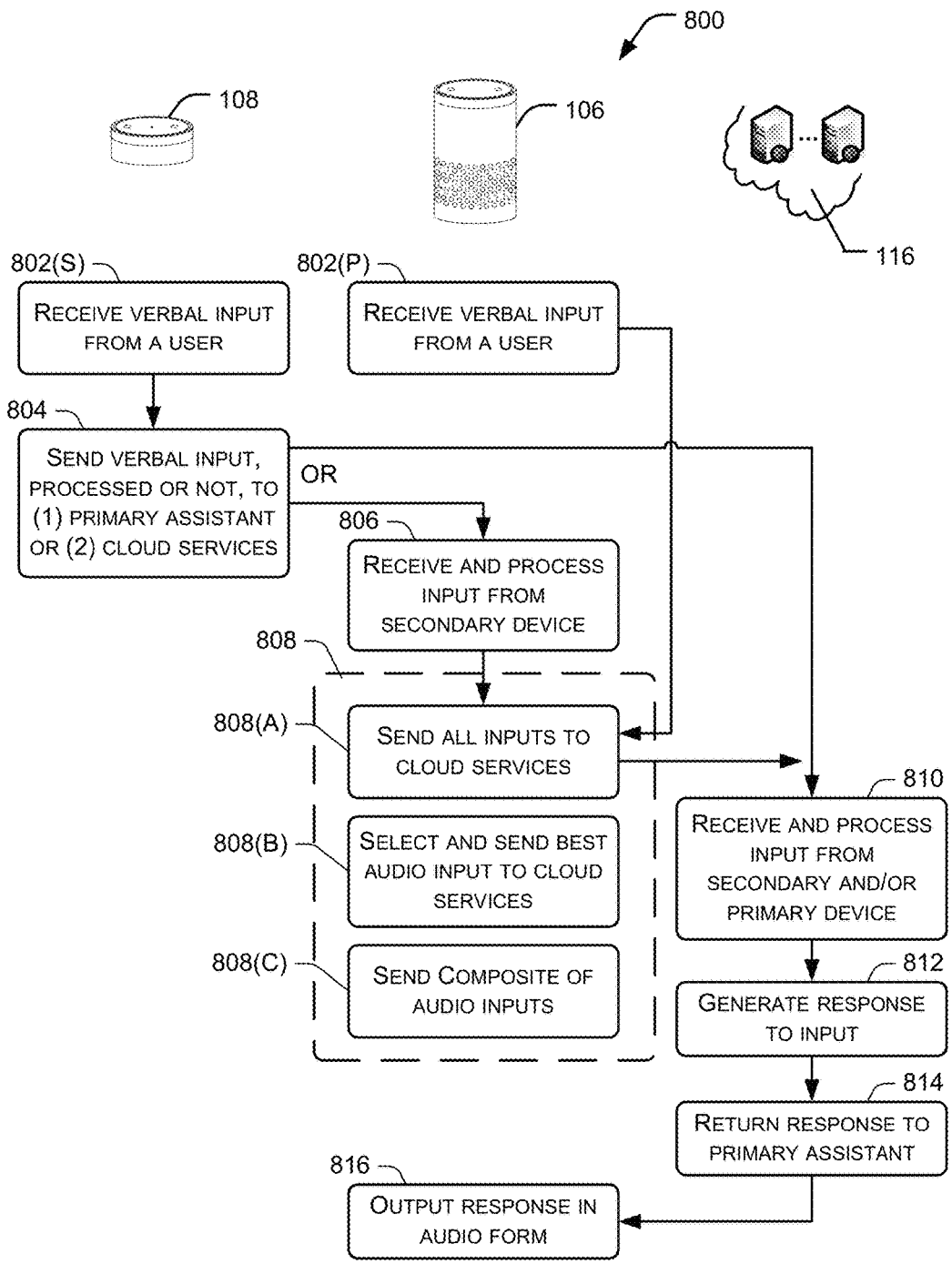
FIG. 8 is a flow diagram showing an illustrative process to operate the distributed voice controlled system.

FIG. 8 is a flow diagram of an illustrative process 800 to operate the distributed voice controlled system 104. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For purposes of discussion, the process 800 is described with reference to the primary voice controlled assistant 106 and the secondary voice controlled assistant 108. Acts performed by these assistants are graphically aligned beneath the devices in FIG. 8 to illustrate one example implementation of the process 800.

At 802(S), the secondary assistant 108 receives verbal input from the user. The verbal input may be for essentially any purpose, such as speaking a command, dialoging with a far end talker, and the like. The microphone array on the secondary assistant 108 may be shaped through beam forming techniques to detect the user speech and convert the audio input to a digital signal. The secondary assistant 108 may perform partial or full speech recognition processing, or alternatively simply pass the digital signal onto another entity for processing. Concurrently, at 802(P), the primary assistant 106 may receive the same verbal input from the user. The microphone array on the primary assistant 106 may also be shaped to detect the user speech. The secondary assistant 108 may perform partial or full speech recognition processing, or alternatively simply pass the digital signal onto another entity for processing.

At 804, the secondary assistant 108 sends the verbal input—unprocessed, partially processed, or fully processed—onto either the primary assistant 106 or to the cloud services 116. In some implementations, the secondary assistant 108 may only be equipped with near field capabilities, such as Bluetooth or Wi-Fi, and hence communicates directly with the primary assistant 106, which can then communicate with the remote services 116. Alternatively, the secondary assistant 108 is connected to send the audio input directly to the cloud services 116 over a network connection, such as via a Wi-Fi connection to one or more networks.

At 806, the primary assistant 106 may receive the audio input from the secondary assistant 108 over a local connection, such as Bluetooth or Wi-Fi. In other implementations, various signal representations of the verbal input may be received from multiple secondary devices. The primary assistant 106 may then process the various audio inputs using speech recognition and/or natural language processing techniques, either partly or in full, to produce a query that can be handled by the cloud services.

At 808, the primary assistant 106 sends one, all, a composite, or some combination of verbal inputs to the cloud services. For purposes of discussion, representative implementations are discussed in more detail as options A, B, and C. For instance, as one implementation at 808(A), the primary assistant 106 simply sends all audio streams to the cloud services 116 for processing and execution. In this case, the cloud services may select the best input, or process a composite of the inputs to initiate an operation.

In another implementation at 808(B), the primary assistant 106 may determine the best processed audio stream to send to the cloud services 116. That is, the primary assistant 106 may use various techniques to ascertain which stream the best, such as time-of-arrival (the signal that arrives first may be deemed the best), signal-to-noise ratio (SNR), echo cancellation, confidence from a wake word engine, the confidence level of wake word, or any other parameters that may be employed. In certain implementations, this determination may be made as a function of multiple techniques. The selected audio stream, or a processed representation of it, is then sent to the cloud services.

In still another implementation at 808(C), the primary assistant 106 may combine the inputs from itself and any of the secondary assistants, such as assistant 108, and send a composite stream to the cloud services 116. The primary assistant may combine the verbal inputs or process them in some manner to provide a composite signal.

At 810, the cloud services 116 receives and processes either the verbal input from the secondary assistant 108 and/or the processed input from the primary assistant 106. The cloud services 116 use the resulting query or instruction to perform one or more operations. These operations may involve searching a database, playing some entertainment (e.g., music, video, etc.), executing a transaction (e.g., e-commerce, banking, financial, etc.), or essentially any other function. At 812, the cloud services 116 generate a response to the input. The response may be in a data format that is easily transmissible over a network. At 814, the response is returned to the primary assistant 108.

At 816, the primary assistant 106 outputs the response in audible form. In one implementation, the primary assistant 106 includes a text-to-speech engine that converts the data into audible output that is emitted by the speakers of the primary assistant. In another implementation, the response is in a digital audio format that is simply played over the speakers in the primary assistant 106.

In this manner, the user may input commands or requests via one or more of the assistants, including a secondary assistant 108, and the response is played back from the speakers of the primary assistant 106.

Figure 9:
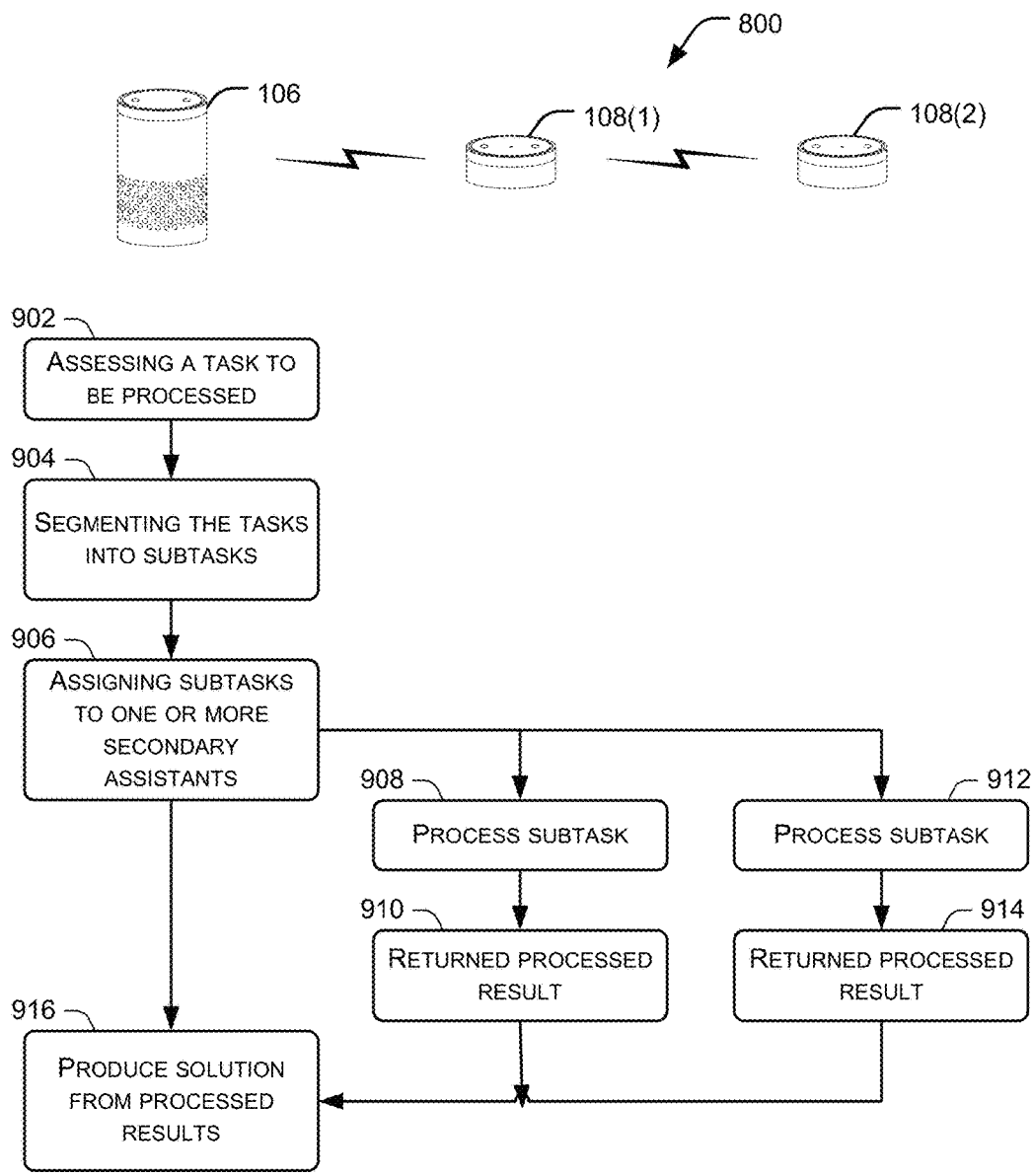
FIG. 9 is a flow diagram showing an illustrative process of distributing processing tasks across the assistants in the system.

FIG. 9 shows a process 900 for distributing processing across the assistants in the voice controlled system. In some situations, the processing units of the assistants may be idle and hence available for processing tasks being performed by other assistants, notably the primary assistant. For instance, in certain implementations, the secondary assistant(s) may not be equipped with speech recognition and/or natural language processing. In such cases, the processing unit may be available to assist in other tasks, such as audio compression, echo cancellation, noise reduction, blind source separation, and adaptive beam forming.

At 902, the primary assistant 106 assesses a task to be processed. The task may be essentially any processing task that may be handled by a processing unit of the secondary assistants 108(1) and 108(2). Examples of tasks may include echo cancellation, audio compression, noise reduction, blind source separation, wake word evaluation, adaptive beam forming, and so forth. Although only two assistants are shown in FIG. 9, one or more than two assistants may be used in the process 900. At 904, the primary assistant 106 segments the task into subtasks. At 906, the subtasks are assigned to one or more secondary assistants and transferred to them over a local area network connection, such as Wi-Fi, Wi-Fi direct, or Bluetooth. In this example, subtasks are assigned to both of the secondary assistants 108(1) and 108(2). In other implementations, the primary assistant may consider assign whole tasks to one or both secondary assistants 108(1) and 108(2).

At 908, the first secondary assistant 108(1) processes a subtask to produce a result. The result is then returned to the primary assistant 106 at 910. Similarly, at 912, the other secondary assistant 108(1) processes a subtask to produce a result. The result is then returned to the primary assistant 106 at 914. In other implementations, this distributed processing may be extended to other resources in the environment, such as mobile devices, computers, entertainment devices, and so forth. Such devices may be coupled to the primary and/or secondary assistants via local network resources, such as Wi-Fi or Bluetooth.

At 916, the primary assistant 106 uses the processed results from the secondary assistant to produce a solution.

Figure 10:
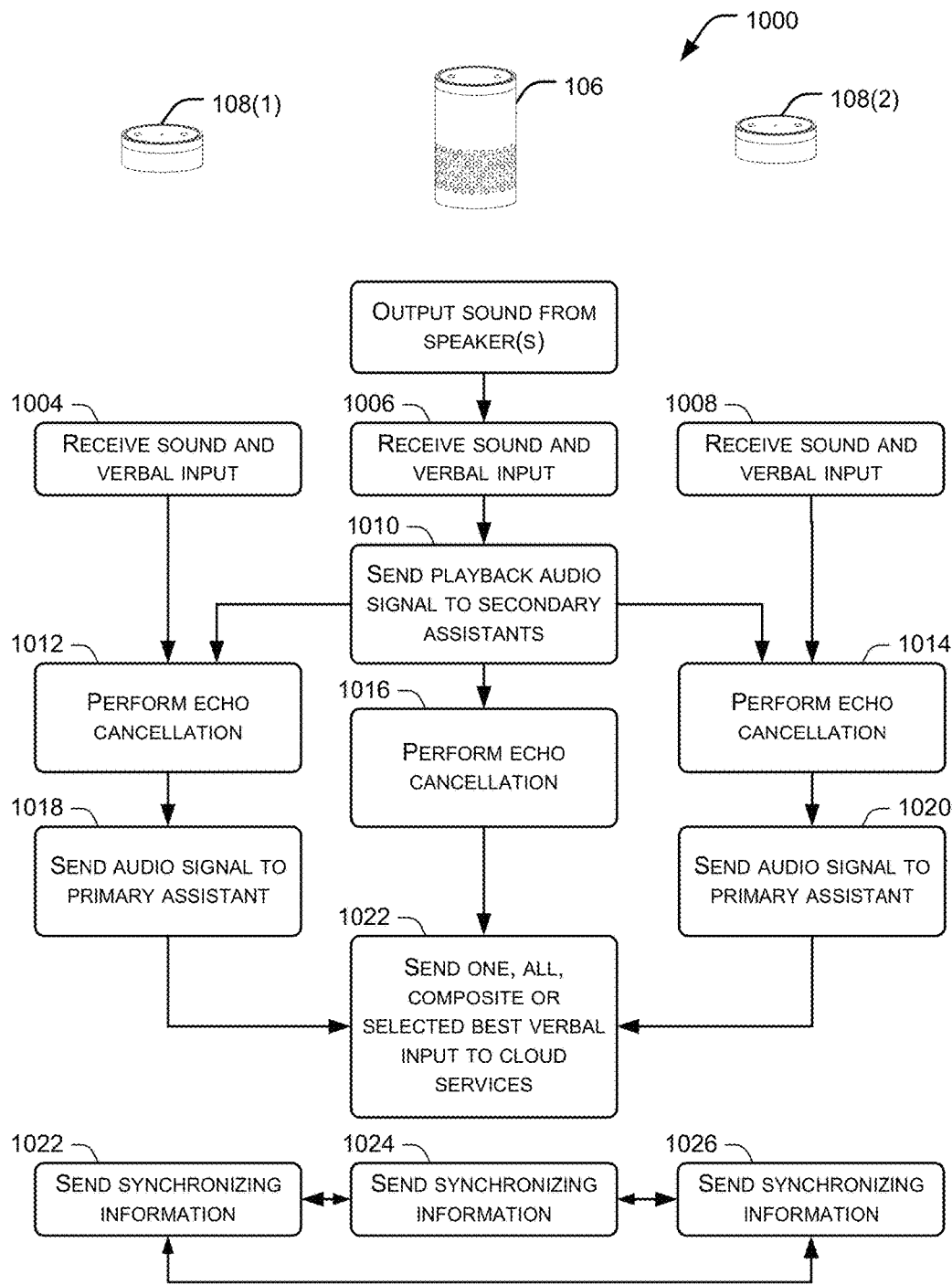
FIG. 10 is a flow diagram showing an illustrative process of synchronizing assistants in the system for purposes of receiving audio input and performing acoustic echo cancellation.

FIG. 10 shows a process 1000 for synchronizing assistants in the system for purposes of receiving audio input and performing acoustic echo cancellation. In this example, there are two secondary assistants 108(1) and 108(2) and one primary assistant 106.

At 1002, the primary assistant 106 outputs sound from its one or more speakers. At 1004, 1006, and 1008, the three assistants each detect and receive the audio sound output from the speakers, as well as any verbal input from a user. At 1010, the primary assistant 106 sends the playback audio used to produce the speaker output sound to the secondary assistants 108(1) and 108(2). At 1012, 1014, and 1016, the secondary assistants 108(1) and 108(2) and the primary assistant 106 use the playback audio as a reference signal for echo cancellation. One technique for using a common or shared reference signal for echo cancellation across multiple devices is described in more detail in U.S. patent application Ser. No. 13/589,967, entitled "ECHO CANCELLATION BASED ON SHARED REFERENCE SIGNALS", which was filed on Aug. 20, 2012 on behalf of Menashe Haskin et al. This application is hereby incorporated by reference.

At 1018 and 1020, the secondary assistants 108(1) and 108(2) send the audio signals, which are predominantly the verbal input post echo cancellation, to the primary assistant 106. At 1022, the primary assistant 106 sends one, all, a composite, or a selected best verbal input to send to the cloud services.

To improve effectiveness of the AEC process, the three assistants may be routinely synchronized by exchanging synchronizing information as indicated by acts 1022, 1024, and 1026. The three assistants may be equipped with synchronization logic to achieve this synchronization. Acoustic echo cancellation techniques may accommodate some synchronization of the signals. However, in the system architecture with independent assistants, each of the assistants has its own clock and crystal. The absolute times of the clocks and/or the crystal pulses may not, at times, be identical. Further, the wireless interface may add further variable delay that degrades the AEC effectiveness over time. Accordingly, the assistants are equipped with synchronization units that exchange synchronization signals to routinely realign the clocks relative to one another. One technique for synchronizing for clock drift is described in more detail in U.S. patent application Ser. No. 14/109,756, entitled "CORRECTING CLOCK DRIFT VIA EMBEDDED SIN WAVES", which was filed on Dec. 17, 2013 on behalf of Robert Ayrapetian et al. This application is hereby incorporated by reference.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, at a first device, verbal input representing a request;
   generating first audio data representing the verbal input;
   receiving, at the first device, second audio data representing the verbal request as captured by a second device;
   generating a signal representation of the verbal request based at least in part on the first audio data or the second audio data; and
   sending the signal representation to a remote system for processing.

2. The computer-implemented method as recited in claim 1, wherein generating the signal representation comprises selecting one of the first audio data or the second audio data based at least in part on at least one of: a time-of-arrival value, a signal-to-noise ratio, echo cancellation data, or a confidence value that a wake word has been detected.

3. The computer-implemented method as recited in claim 1, wherein generating the signal representation comprises generating the signal representation based at least in part on:
   using only the first audio data;
   using only the second audio data; or
   using a composite of the first audio data and the second audio data.

4. The computer-implemented method as recited in claim 1, wherein generating the signal representation comprises generating the signal representation based at least in part on at least one of: a time-of-arrival value, a signal-to-noise ratio, or an utterance-recognition confidence value.

5. The computer-implemented method as recited in claim 1, further comprising:
   determining a first confidence value associated with detection of a wake word from the first audio data;
   receiving, from the second device, a second confidence value associated with detection of the wake word from the second audio data;
   determining that the first confidence value is greater than the second confidence value; and
   wherein generating the signal representation comprises selecting the first audio data.

6. The computer-implemented method as recited in claim 1, further comprising:
   exchanging synchronization information among the first device and the second device, the synchronization information configured to at least reduce a timing delay associated with the transmission of data between the first device and the second device; and
   performing echo cancellation on the signal representation based at least in part on the synchronization information.

7. The computer-implemented method as recited in claim 1, further comprising:
   transmitting, via the first device, a reference signal to the second device; and
   wherein the second audio data comprises an echo-cancelled instance of the second audio data based at least in part on the reference signal.

8. The computer-implemented method as recited in claim 1, further comprising:
   causing, based at least in part on receiving the verbal input, a light indicator of the first device to emit first light indicating a state of the first device; and
   sending, from the first device to the second device, an instruction causing the second device to operate in the state and to emit second light from a second light indicator of the second device.

9. A computer-implemented method comprising:
   receiving, at a primary device, a first signal representation of verbal input;
   receiving, at the primary device and from a secondary device, a second signal representation of the verbal input;
   generating audio data based at least in part on at least one of the first signal representation or the second signal representation;
   processing, based at least in part on speech recognition techniques, the audio data to determine query data representing the verbal input; and
   sending the query data to a remote system to perform an operation associated with the query data.

10. The computer-implemented method as recited in claim 9, further comprising:
- determining a first confidence value associated with detection of a wake word from the first signal representation;
- receiving, from the secondary device, a second confidence value associated with detection of the wake word from the second signal representation;
- determining that the first confidence value is greater than the second confidence value; and
- wherein generating the audio data comprises selecting the first signal representation.

11. The computer-implemented method as recited in claim 9, wherein generating the audio data comprises generating the audio data based at least in part on at least one of: a time-of-arrival value, a signal-to-noise ratio, or an utterance-recognition confidence value.

12. The computer-implemented method as recited in claim 9, further comprising:
- exchanging synchronization information between the primary device and the secondary device, the synchronization information configured to at least reduce a timing delay associated with the transmission of data between the primary device and the secondary device; and
- performing echo cancellation on the audio data based at least in part on the synchronization information.

13. The computer-implemented method as recited in claim 9, further comprising:
- transmitting, from the primary device, a reference signal to the secondary device;
- transmitting, from the primary device to the secondary device, an instruction causing the secondary device to perform echo cancellation based at least in part on the reference signal; and
- wherein receiving the second audio data comprises receiving an echo-cancelled instance of the second audio data.

14. The computer-implemented method as recited in claim 9, wherein generating the audio data comprises selecting one of the first signal representation or the second signal representation based at least in part on at least one of: a time-of-arrival value, a signal-to-noise ratio, echo cancellation data, or a confidence value that a wake word has been detected.

15. The computer-implemented method as recited in claim 9, wherein generating the audio data comprises generating the audio data based at least in part on:
- using only the first signal representation;
- using only the second signal representation; or
- using a composite of the first signal representation and the second signal representation.

16. The computer-implemented method as recited in claim 9, further comprising:
- causing, based at least in part on receiving the first signal representation, a light indicator of the primary device to emit first light indicating a state of the primary device; and
- sending, from the primary device to the secondary device, an instruction causing the secondary device to operate in the state and to emit second light from a second light indicator of the secondary device.

17. A system comprising:
- one or more processors; and
- non-transitory computer-readable media storing instructions that, when executed by the one or more processors, cause the one or more processors to perform operations comprising:
  - receiving, at a first device, verbal input;
  - generating first audio data representing the verbal input;
  - receiving, at the first device, second audio data representing the verbal input as captured by a second device;
  - generating a composite signal based at least in part on the first audio data and the second audio data; and
  - sending the composite signal to a remote system for processing.

18. The system as recited in claim 17, wherein generating the composite signal comprises generating the composite signal based at least in part on at least one of: a time-of-arrival value, a signal-to-noise ratio, or an utterance-recognition confidence value.

19. The system as recited in claim 17, the operations further comprising:
- exchanging synchronization information between the first device and the second device, the synchronization information configured to at least reduce a timing delay associated with the transmission of data between the first device and the second device; and
- performing echo cancellation on the audio data based at least in part on the synchronization information.

20. The system as recited in claim 17, the operations further comprising:
- transmitting, from the first device, a reference signal to the second device;
- transmitting, from the first device to the second device, an instruction causing the second device to perform echo cancellation based at least in part on the reference signal; and
- wherein receiving the second audio data comprises receiving an echo-cancelled instance of the second audio data.

* * * * *